United States Patent
Markham (10) Patent No.: US 12,419,277 B2
(45) Date of Patent: *Sep. 23, 2025

(54) PET TOY WITH INTERCONNECTING GROOVES AND OPEN CORE

(71) Applicant: Bounce Enterprises LLC, Golden, CO (US)

(72) Inventor: Joseph P. Markham, Golden, CO (US)

(73) Assignee: Bounce Enterprises LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,495

(22) Filed: May 20, 2024

(65) Prior Publication Data

US 2024/0298608 A1 Sep. 12, 2024

Related U.S. Application Data

(63) Continuation of application No. 18/142,959, filed on May 3, 2023, now Pat. No. 12,075,757, which is a continuation of application No. 17/138,590, filed on Dec. 30, 2020, now Pat. No. 11,678,644.

(51) Int. Cl.
*A01K 15/02* (2006.01)

(52) U.S. Cl.
CPC .................. *A01K 15/026* (2013.01)

(58) Field of Classification Search
CPC .... A01K 15/026; A01K 15/025; A01K 15/02; A63B 43/002; A63B 43/007
See application file for complete search history.

(56) References Cited

U.S. PATENT DOCUMENTS

| | | |
|---|---|---|
| 3,830,202 A | 8/1974 | Garrison |
| 4,802,444 A | 2/1989 | Markham et al. |
| 5,207,420 A | 5/1993 | Crawford et al. |
| 5,865,146 A | 2/1999 | Markham |
| 5,947,061 A | 9/1999 | Markham et al. |
| 6,148,771 A | 11/2000 | Costello |
| 6,634,970 B2 | 10/2003 | Jiminez |

(Continued)

FOREIGN PATENT DOCUMENTS

| | | |
|---|---|---|
| JP | 2020532294 A | 11/2020 |
| WO | 2022147260 A1 | 7/2022 |

OTHER PUBLICATIONS

Banks, Rachel, "Examination Report Regarding Application No. GB2309096.2", Aug. 10, 2023, pp. 4, Published in: GB.

(Continued)

*Primary Examiner* — Trinh T Nguyen
(74) *Attorney, Agent, or Firm* — NOD Law PC (57) ABSTRACT

The pet toy of the invention comprises a spherical shaped body with eight distinct quadrants formed on the exterior surface thereof. Each section is three sided, similar to an equilateral triangle except each corner of the triangular-shaped is curved or rounded. A central opening is formed through the pet toy. Preferably, the pet toy is hollow and the pet toy has a substantially uniform sidewall thickness, thereby creating an open core. Measured parameters of the pet toy are provided to minimize the potential of the toy becoming caught in an animal's throat yet the pet toy is still configured to maximize play potential. The measured parameters include, in various combinations of a weight of the pet toy, a diameter of the pet toy, depths of grooves in the pet toy, widths of the grooves and shapes of the grooves.

20 Claims, 5 Drawing Sheets

(56) References Cited

U.S. PATENT DOCUMENTS

| | | | |
|---|---|---|---|
| D545,509 S | 6/2007 | Wang | |
| 7,600,488 B2 | 10/2009 | Mann | |
| 8,113,150 B1 | 2/2012 | Tsengas | |
| 9,770,010 B2 | 9/2017 | Wechsler et al. | |
| 9,844,703 B1 | 12/2017 | Gupta et al. | |
| D817,562 S | 5/2018 | Markham | |
| 10,285,380 B1 | 5/2019 | Mullin | |
| D886,397 S | 6/2020 | Unknown | |
| 11,678,644 B2 | 6/2023 | Markham | |
| 2012/0279459 A1 | 11/2012 | Angle et al. | |
| 2013/0074780 A1 | 3/2013 | Wechsler | |
| 2014/0209038 A1 | 7/2014 | Simon | |
| 2022/0201978 A1 | 6/2022 | Markham | |
| 2023/0337632 A1 | 10/2023 | Markham | |

OTHER PUBLICATIONS

CNIPA, Notification of Second Office Action issued in CN Application No. 202180088470.6, May 9, 2024, 15 pages.

CNIPA, Notification of the First Office Action in 202180088470.6, Jan. 4, 2024, pp. 16.

Cole, Douglas, Response to Examination Report issued in GB Application No. 2400127.3, Jul. 22, 2024, 4 pages.

EPO, European Search Report for application No. 21916502.4, Mar. 19, 2024, pp. 12.

Final Office Action received for U.S. Appl. No. 17/138,590, dated Feb. 24, 2023, 29 pages.

GoughNuts Pro 50 Ball Dog Toy, 3-in, 3 pages, online available at https://www.chewy.com/goughnuts-pro-50-ball-dog-toy-3-in/dp/221413, Known as early as Jun. 22, 2021.

GoughNuts, Interactive ball, 3 pages, online available at https://www.goughnuts.com/balls-2, Known as early as Jun. 22, 2021.

goughnuts.com, "goughnuts.com", 2007, pp. 6.

International Preliminary Report on Patentability received for PCT Application Serial No. PCT/US2021/65697 dated Jul. 13, 2023, 10 pages.

International Search Report and Written Opinion received for PCT Application Serial No. PCT/US2021/65697 dated Mar. 7, 2022, 13 pages.

Japan Patent Office, Notice of Reasons for Rejection in 2023-540690, Jan. 29, 2024, pp. 10.

Nguyen, Trinh T, Office Action issued in U.S. Appl. No. 18/142,959, Nov. 16, 2023, 27 pages.

Non-Final Office Action received for U.S. Appl. No. 17/138,590, dated Jun. 20, 2022, 37 pages.

Notice of Allowance received for U.S. Appl. No. 17/138,590, dated May 3, 2023, 33 pages.

Percival, Shane, Response to final office action issued in U.S. Appl. No. 17/138,590, Apr. 20, 2023, 15 pages.

Response to Office Action issued in CN Application No. 202180088470.6, Jul. 30, 2024, 12 pages.

Smith, Drew, Response to Office Action issued in U.S. Appl. No. 18/142,959, Apr. 15, 2024, 7 pages.

UKIPO, Combined Search and Examination Report under Sections 17 and 18(3) for Application No. GB2400127.3, Feb. 26, 2024, pp. 8.

UKIPO, Examination Report issued in Application No. GB2400127.3, May 21, 2024, 4 pages.

Nguyen, Trinh T, Office Action issued in U.S. Appl. No. 18/344,710, Oct. 9, 2024, 45 pages.

UKIPO, Search Report under Section 17(5) issued in Application No. GB2400292.5, Dec. 3, 2024, 5 pages.

PET TOY WITH INTERCONNECTING GROOVES AND OPEN CORE

PRIORITY

This application claims priority to and is a continuation of U.S. patent application Ser. No. 18/142,959, which claims priority to and is a continuation of U.S. patent application Ser. No. 17/138,590 (now issued U.S. Pat. No. 11,678,644), filed Dec. 30, 2020, all of which is incorporated by reference in its entirety.

FIELD OF THE INVENTION

The invention relates to a pet toy especially designed to function as a ball for throw and retrieve, and more particularly, to a dog toy having interconnecting and continuous grooves to prevent blockage of airflow while a dog holds the pet toy in its mouth regardless of the depth of the toy in the dog's mouth and throat.

BACKGROUND OF THE INVENTION

One general category of pet toys is those made of a flexible or elastomeric material, such as rubber. These toys, if made from quality materials, can withstand the biting action of an animal, and can keep an animal occupied for extended periods of time. It is known to place treats in these types of toys to increase the interaction of the animal with the toy. A sound emitting device, often referred to as a "squeaker", is also known to be placed inside the toy to further stimulate the animal.

Another general category of pet toys are those which may generally be referred to as "plush" toys. These types of toys are made from different types of cloth or fabric, and may also include material woven into strands, such as nylon rope. The plush toy is typically stuffed with a fibrous material, such as polyester stuffing, to provide the toy with an increased thickness or bulk that enables the animal to chew on the toy. Plush toys may also include squeakers to further stimulate the animal.

One particularly popular dog toy is a simple ball toy that can be used for fetch and retrieve play. There are many flexible and elastomeric balls manufactured as dog toys. Balls are easy to throw by an owner and the rolling action of a ball enables it to travel adequate distances when thrown. The curved, spherical shape of a ball is easy for dog to hold within its mouth.

While balls continue to be one of the most common types of dog toys, there are also problems associated with use of balls as dog toys. Likely the most problematic feature of balls as dog toys is that balls can become stuck in the throat of the dog. Balls have unfortunately been linked with dog deaths by asphyxiation. If the diameter of a ball is close to the diameter of the throat opening in a dog, the ball can become lodged in the throat of the dog under many circumstances. One circumstance is when a dog catches the ball in midair and the force of the ball causes it to lodge in the throat opening of the animal. Another circumstance is the inadvertent lodging of the ball in the throat as an owner may attempt to remove the ball from the dog's mouth; the act of moving the hand against the ball can in some circumstances cause the ball to be pushed down further into the animal's mouth and into the throat opening.

Other problems associated with hollow balls is that a dog may be able to easily chew through the material of the ball and ingest pieces of the ball. Tennis balls have long been used as dog toys and are most widely used, but unfortunately, many tennis balls are not of sufficient quality and therefore, the dog can easily chew through the tennis ball material.

A problem can also be associated with flexible, hollow balls in that the flexing or deformation of the ball may allow the ball to penetrate deeper into the dogs throat, therefore presenting a choking hazard.

Any circumstance associated with lodging of a ball in the throat of a dog can result in a tragic and unfortunate event, one that can be avoided with proper sizing of a ball and selection of the type of ball being used. Unfortunately, proper sizing of a ball for a particular dog is not made apparent in the sale and promotion of balls as dog toys. Oftentimes, a manufacturer may only provide a single size ball which is ultimately sold to dog owners of many different size breeds.

Considering the foregoing disadvantages of the use of traditional balls as dog toys, there is a need to provide a dog toy which has the same characteristics as a ball for use in play such as fetch and retrieve play but overcomes the potential dangers of a ball presenting a choking hazard. Further, there is a need to provide a pet toy which can be used by dog breeds of many sizes, but still maintains adequate safety to prevent choking.

One commercially available pet toy which functions as a ball but further includes a plurality of interconnected channels is the Goughnuts® interactive ball dog toy. This dog toy as its peripheral surface segmented into eight distinct quadrants or sections with grooves that separate the sections. The walls of the grooves are parallel to one another and a cross-sectional view of the grooves provide a distinct U-shape. The edges of the grooves are very slightly rounded, but still present sharp edges. The grooves each have a wide and uniform cross-sectional U-shape.

One patent reference that discloses a pet toy similar in shape to the Goughnuts® interactive ball dog toy, but with noticeable modifications, is the US Design U.S. Pat. No. 817,562. This reference more particularly discloses a dog toy with a peripheral surface also segmented into eight distinct quadrants or sections, but the grooves are significantly wider and shallower. The walls of the grooves also present a U-shape when viewed in cross-section, but the U shape is noticeably wider and shallower.

While the Goughnuts® interactive ball dog toy and the US Design U.S. Pat. No. 817,562 may be adequate for their intended purposes, further improvements are required in order for dog toys of these general designs to be able to adequately prevent choking. In connection with the invention described herein, specific features of the invention are described in detail which ensure that the dog toy can be used safely with many different sized breeds, yet the dog toy of the present invention can still serve as a functional ball for use in play such as fetch and retrieve.

Accordingly, the specific attributes and features of the invention described herein should be understood by one skilled in the art to sufficiently distinguish over the known prior art.

SUMMARY OF THE INVENTION

The pet toy of the invention in one preferred embodiment comprises a spherical shaped body with eight distinct quadrants or sections formed on the exterior surface thereof. Each section is three sided, similar to an equilateral triangle except each corner of the triangular-shaped is curved or rounded. A central opening is formed through the pet toy.

There may be a single central opening, or the opening may extend through both opposite sides of the pet toy. Preferably, the pet toy is hollow and the pet toy has a substantially uniform sidewall thickness, thereby providing a pet toy with an open core.

The particular material for the pet toy may be selected from a group of moldable, elastomeric rubber compounds and preferably, puncture resistant rubber compounds that will withstand the biting action of an animal.

A plurality of grooves or channels are defined between each quadrant or section. The sidewalls of the grooves present a substantially V-shaped configuration in which the grooves progressively narrow as the grooves extend towards the center of the pet toy. The bottom of the grooves may have a very slight gap thus separating facing sidewalls, but to the observable eye, this slight gap is nearly imperceptible thus maintaining a distinct visual V-shaped configuration.

Another way in which to describe each corner of the triangular shaped sections is that each of the corners have distinct curved chamfers that cause the walls of the grooves to maintain their distinct V-shaped appearance in cross-section.

At the six locations on the outer surface of the toy where the edges of four sections meet, a diamond-shaped area is found that is a function of the presentation of the deepest edges of the adjacent groove sidewalls.

As discussed in further detail below, the particular sizing and spacing of the grooves, as well as the V-shaped orientation of the grooves maximizes the ability of the toy to maintain an airway when the toy is held within the animal's mouth and more particularly, if the toy becomes lodged deeper in the mouth into the throat of the animal. The substantially spherical shape of the toy without protruding edges enables the pet toy to still roll like a ball and to be thrown like a ball. Further, the central opening provides an additional means for maintaining an airway when the ball is held in a dog's mouth.

According to another preferred embodiment of the invention, the pet toy may include a strand of rope or other fibrous material that is placed through the central opening. The rope may include one or more knots. Use of the rope may enhance play with the dog in which the rope can be used to play tug, or to enhance throwing action for the owner. Alternatively, the rope may also provide a dog a different type of texture for chewing.

Considering the foregoing features of the invention in various preferred embodiments, in one general aspect, the invention may be considered a pet toy comprising: a body having an exterior surface and a sidewall having a substantially uniform thickness; a central opening formed through the exterior surface; a hollow core forming an interior of said body; a plurality of sections extending outward from said exterior surface and defined by grooves that bound each said quadrant, each of said sections having a triangular shape; each of said grooves having a V-shape when viewed in cross-section; and wherein a depth of said grooves is between about 1/16th to 1/4th inch and an angle subtended by the V-shape is between about 30° to 60°.

According to another general aspect of the invention, it may be considered a pet toy comprising: a body having an exterior surface and a sidewall having a substantially uniform thickness; a central opening formed through the exterior surface; a hollow core forming an interior of said body; a plurality of sections extending outward from said exterior surface and defined by grooves that bound each said quadrant, each of said sections having a triangular shape; each of said grooves having a V-shape when viewed in cross-section; and wherein a depth of said grooves is between about 1/16th to 1/4th inch, a diameter of the pet toy is at least 2.5 inches, a width of said grooves as measured near said exterior surface is between about 3/8 to 1/2 inch.

According to yet another general aspect of the invention, it may be considered a pet toy comprising: a body having an exterior surface and a sidewall having a substantially uniform thickness; a central opening formed through the exterior surface; a hollow core forming an interior of said body; a plurality of sections extending outward from said exterior surface and defined by grooves that bound each said quadrant, each of said sections having a triangular shape; each of said grooves having a V-shape when viewed in cross-section; and wherein a depth of said grooves is between about 1/16th to 1/4th inch, a diameter of the pet toy is at least 2.5 inches, a width of said grooves as measured near said exterior surface is between about 3/8 to 1/2 inch.

Additional features and advantages of the invention will become apparent in connection with the detailed description and the drawings which follow.

DETAILED DESCRIPTION OF THE INVENTION

Referring to each of the figures, the pet toy of the invention 10 is a spherical shaped body with a plurality of quadrants or sections 12 that form the exterior surface of the toy. A central opening 14 is formed through opposite sides of the body. The pet toy preferably has a substantially uniform thickness, also referred to as a substantially uniform sidewall.

A total of eight quadrants or sections 12 make up the outer surface of the toy. Preferably, each of the sections 12 has the same shape and size. The shape of each section 12 is substantially triangular with curved or rounded edges 22 located where two side edges of a section 12 converge. These curved or rounded edges 22 may also be described as chamfered or tapered edges.

Figure 1:
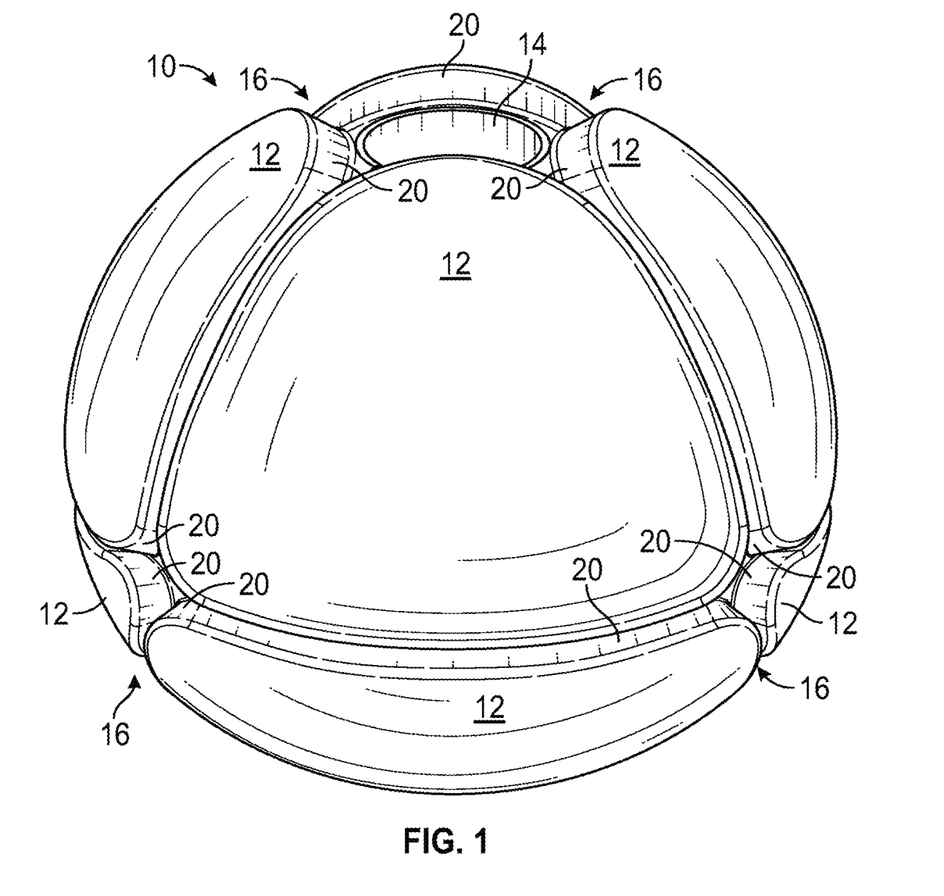
FIG. 1 is a top perspective view of the pet toy of the invention.
Figure 2:
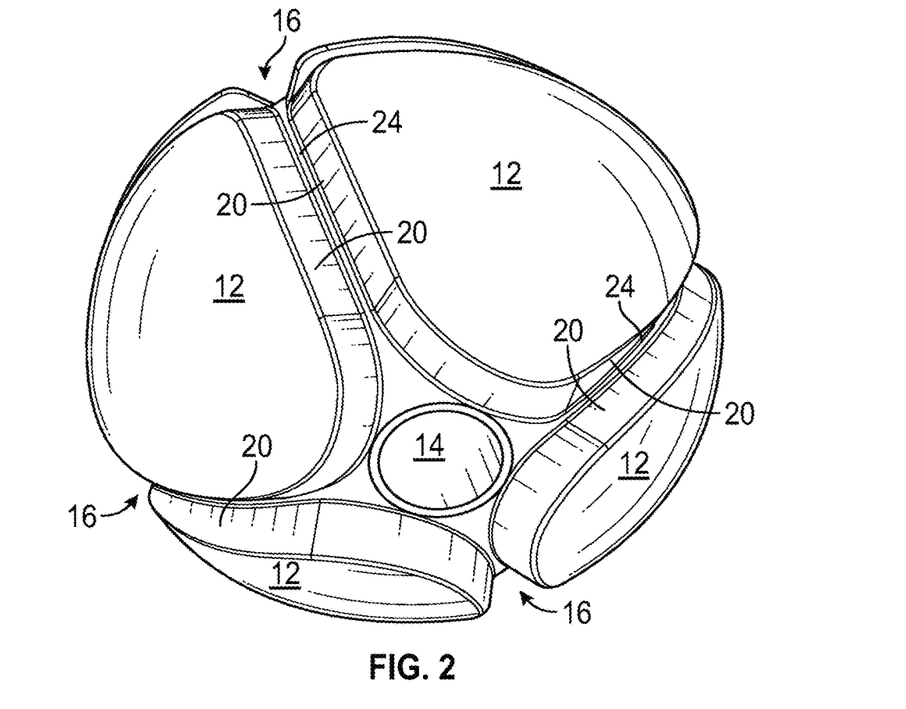
FIG. 2 is a bottom perspective view of the pet toy of the invention.
Figure 3:
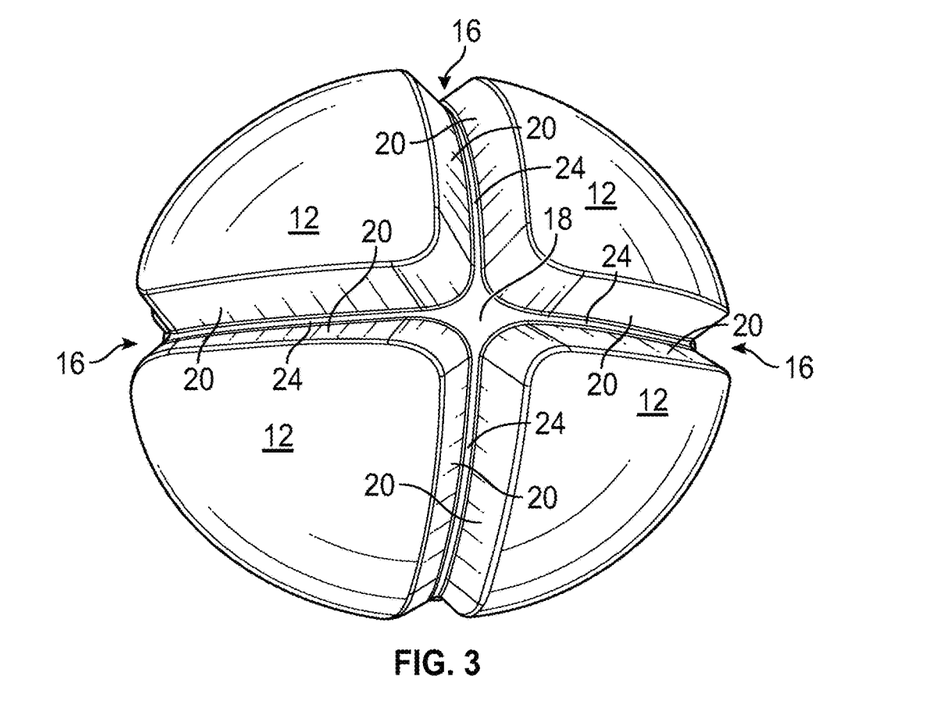
FIG. 3 is a side perspective view of the pet toy of the invention.
Figure 4:
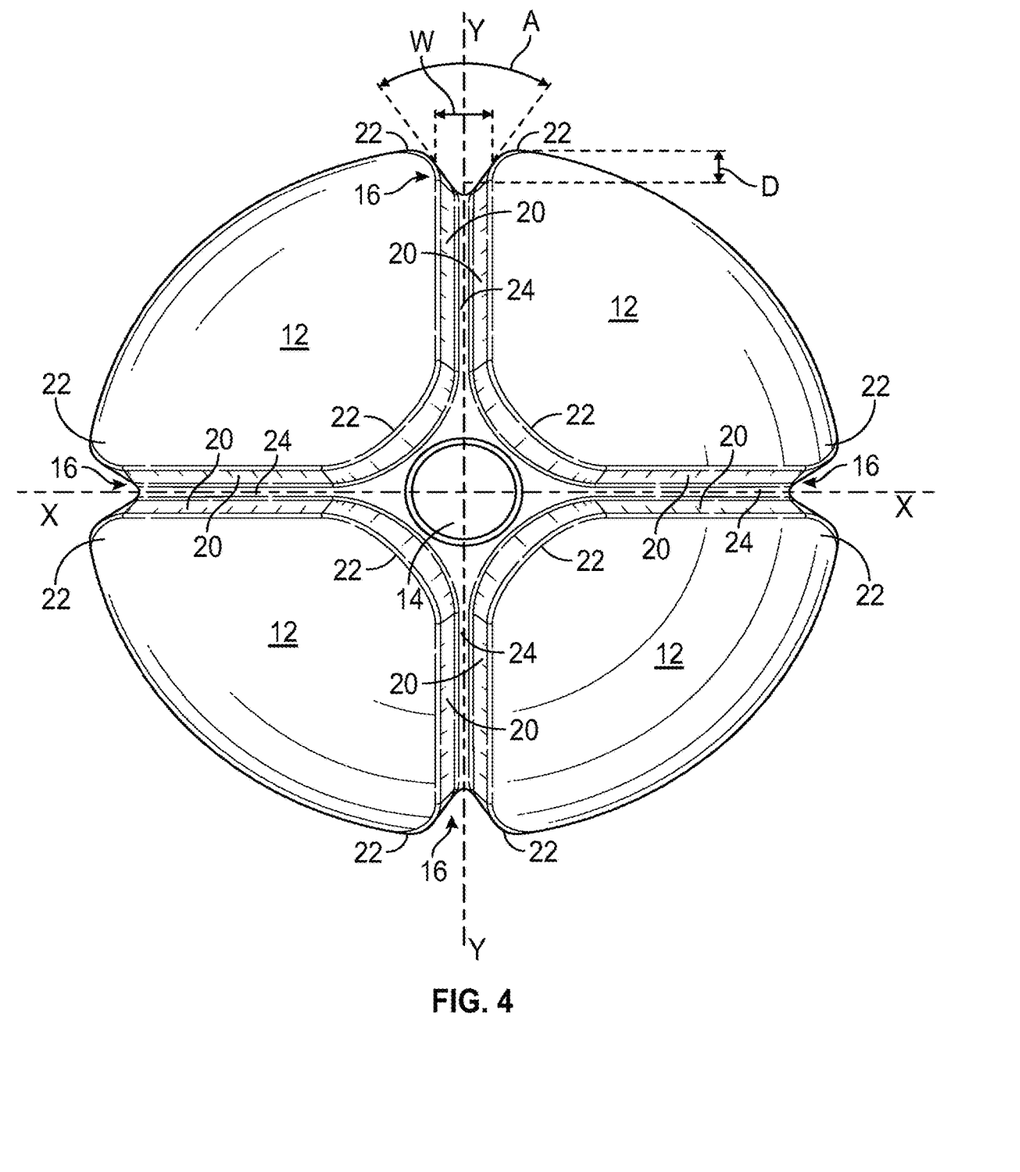
FIG. 4 is an enlarged top elevation view of the pet toy of the invention.
Figure 5:
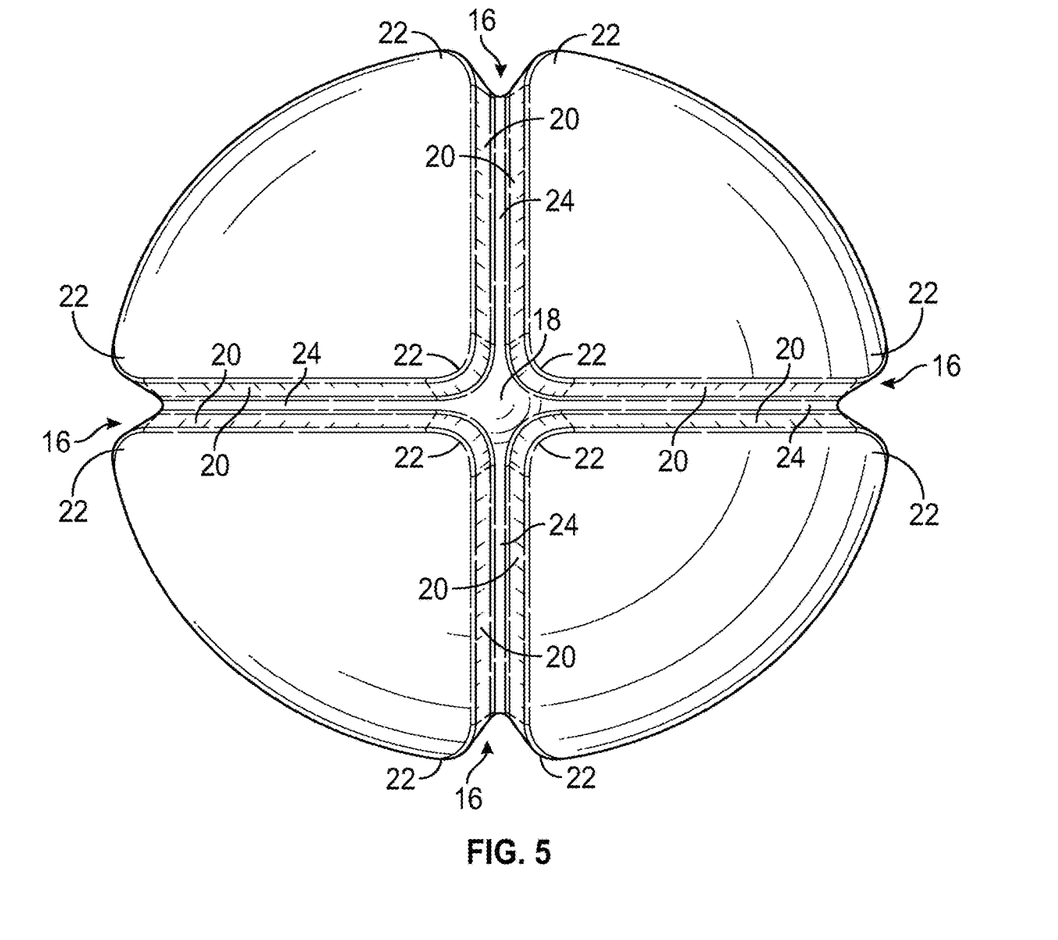
FIG. 5 is an enlarged side elevation view of the pet toy of the invention.
Figure 6:
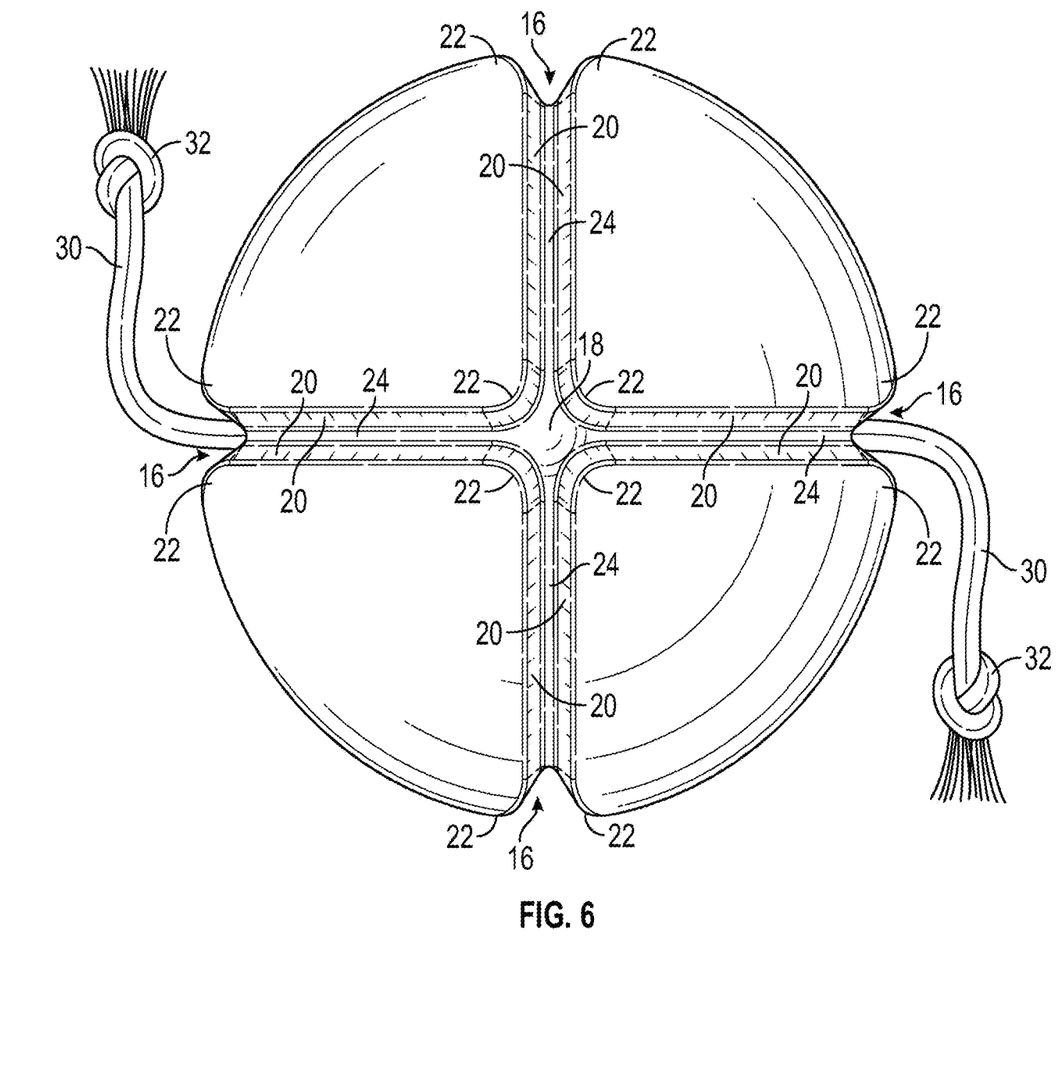
FIG. 6 is an enlarged side elevation view of the pet toy in another embodiment of the invention that includes a strand of fibrous material such as a rope.

Grooves 16 are formed between each of the sections 12. A groove is defined by opposing groove walls 20 that are angled with respect to one another thus forming a distinctive V-shape. The bottom of each groove 24 is defined by a very slight gap 24 between opposing groove walls 20; however, when reviewing a groove such as shown in FIGS. 4-6, the corresponding gap 24 is nearly imperceptible and thus each of the grooves maintain the distinctive V-shape.

At the six locations on the outer surface of the toy where the edges of four sections 12 meet, a diamond-shaped area 18 is present that is a function of the visual presentation of the deepest edges of the adjacent groove sidewalls at that location.

Measured characteristics of the toy, including the depth, width and shape of the grooves 16, are critically important, alone and in combination with one another. Consider the ball as a valve: the throat of a dog is the seat for the valve. One object of the invention is to prevent asphyxiation by preventing the valve from seating or sealing, i.e., cutting off the airway of the dog. Also, throat tissue is semi-soft and wet which makes it easier to seal. During testing of the invention, experiments were conducted with a cylindrical shaped glass of water and prototypes of the invention having varying groove depths. The prototypes were placed to cover the top of the glass. The water glass was tipped upside down to determine the minimum groove depth required to generate an appreciable amount of water flow. The water flow simulated the passage of air through a dog's throat. The testing indicated that 1/16 of an inch was the minimum depth for any appreciable amount of water to flow, thus establishing a minimum amount of air flow through the grooves. The testing further indicated that 1/8 to 1/4 inch was optimal to permit flow of the fluid through the grooves. The tapered or rounded intersection areas between the sections 12 reduce the sealing capability as compared to a groove having only straight groove side edges. Grooves that are too deep reduce structural integrity and therefore, while deeper grooves might permit better airflow, the structural integrity of the toy is degraded to an extent in which a dog can too easily chew off sections of a quadrant around a groove edge. The tapered or rounded groove edges function to deflect a dog's teeth therefore reducing a dog's ability to chew and rip the edges. Even with shallower grooves that have defined sharp edges, i.e., groove edges that are squared-off and have an angle of approximately a 90°, these shallower grooves can be too easily chewed and removed as well.

Grooves that are too wide cause an erratic bounce and it is desirable to maintain the pet toy as a functional ball that uniformly bounces and rolls to optimize play potential.

As compared to a ball with no grooves, the outer surface of the invention with the quadrants and grooves results in a dog being able to reliably grasp and hold the ball in the dog's teeth. There is a high chance that the dog's teeth will penetrate at least one of the grooves during the catching action and therefore, additional frictional resistance results to prevent the ball from penetrating too deep into the dog's throat. A wet round ball certainly raises the risk that the dog will not be able to stop the momentum of the ball in its teeth.

Referring specifically to FIG. 4, according to preferred embodiments of the invention, dimension measurements are provided for the pet toy which enable it to prevent choking and asphyxiation of an animal such as a dog. Preferably, the diameter of the pet toy is at least about 2.5 inches which prevents the pet toy from becoming lodged in a dog's throat. A larger diameter is also contemplated within embodiments of the invention; accordingly, the 2.5-inch diameter can be considered a minimum diameter to prevent asphyxiation for most dogs.

Preferably, the depth D of the grooves is between about 1/8th to 1/4th inch and a minimum depth of at least about 1/16th inch, as mentioned. A width of the groove W measured near the exterior surface of the pet toy is preferably between about 3/8 to 1/2 inch. The angle A subtended by the V-shaped groove is preferably between about 30° to 60°. The diameter of the central opening 14 may be between about 1/2 to 5/8 inch. As mentioned, the central opening 14 provides an additional path for air to flow when the toy is in a dog's mouth.

Another important measured parameter is the weight of the toy. A toy that is too heavy will become lodged deeper in the animal's throat if the animal catches the ball on the fly. A toy that is too light will not provide adequate play because the owner will not be able to throw the toy a sufficient distance. Additionally, a toy that is too light is typically an indicator that the toy is not made of a sufficiently resilient and elastomeric material and therefore, the toy can be more easily destroyed by chewing. Optimally, the pet toy should be made of a resilient and elastomeric rubber compound which provides sufficient strength for a long-lasting pet toy as well as providing sufficient weight.

According to one preferred embodiment of the invention, a ball that has a diameter of between about 2.5 to 4.0 inches may have an optimal weight between about 8 and 11 ounces. Another preferred embodiment may have a diameter of approximately 3.5 inches and a weight of approximately 9.5 ounces.

Considering the foregoing measured parameters and other characteristics of the invention, it should be understood that the invention does not require each measured parameter to be present. Rather, some improved functionality is achieved with the invention by having parameters provided together in various sub-combinations. Therefore, it should be further understood that the scope of the invention herein is not limited to a pet toy that must have all the measured parameters and one may select any sub-combinations for improved toy performance and to prevent asphyxiation of an animal such as a dog.

FIG. 6 illustrates another preferred embodiment in which the pet toy 10 further includes a rope or strand of flexible material or rope 30 with knotted ends 32. The rope 30 is routed through the openings 14 on both opposite ends of the toy. The length of the rope in one preferred embodiment may be between about 12 to 16 inches.

The rope 30 can be used to further enhance play by tug-of-war with a dog or to enhance a throwing action by the pet owner. Another option is to have the rope 30 only extend through one of the openings 14 in which one end of the rope (not shown) remains in the core of the pet toy as by an enlarged knotted end or an end that is otherwise enlarged so it cannot pass through the opening. The other end can be knotted as shown in this figure. Longer lengths of rope are also contemplated which can be adopted for specific purposes, such as enhanced tug-of-war in which greater lengths of the rope can be more easily grasped by the owner and dog.

By use of the rope 30, this provides additional functionality to prevent asphyxiation of an animal because the rope enlarges the overall diameter of the toy and the rope can be pulled by an owner to release the toy if the toy becomes lodged too deep in the dog's throat. The rope also provides additional play opportunities by tug-of-war action in which the owner can grasp one end of the rope and the dog holds the other end of the rope in the teeth. The rope also enhances throwing of the toy.

According to yet another embodiment of the invention, the diameter of the toy can be less than 2.5 inches if the rope is added. The rope provides additional safety so the toy cannot remain lodged in a dog's throat since the owner can pull the rope to dislodge the toy.

While the invention has been described herein with respect to various preferred embodiments, the invention is not limited to such preferred embodiments and the scope of the invention shall therefore be interpreted commensurate with the claims appended hereto.

What is claimed is:

1. A pet toy comprising:
   a body having an exterior surface;
   a hollow core forming an interior of the body; and a plurality of sections extending outward from the exterior surface and defined by grooves that bound each of the sections;

each of the grooves having a V-shape when viewed in cross-section; and wherein a depth of the grooves is between about 1/16th to 1/4th inch and an angle subtended by the V-shape is between about 30° to 60°.

2. The pet toy of claim 1, wherein:
the depth of the grooves is between about 1/16th to 1/8th inch.

3. The pet toy of claim 1, wherein:
a diameter of the pet toy is at least 2.5 inches.

4. The pet toy of claim 1, wherein:
a diameter of the pet toy is between about 2.5 to 4.0 inches.

5. The pet toy of claim 1, wherein:
a weight of the pet toy is between about 8 to 11 ounces.

6. The pet toy of claim 1, wherein:
a weight of the pet toy is approximately 9.5 ounces and a diameter of the pet toy is about 3.5 inches.

7. The pet toy of claim 1, wherein:
a width of the grooves as measured near the exterior surface is between about 3/8 to 1/2 inch.

8. The pet toy of claim 1, wherein:
a diamond shaped-area is present at six locations on the exterior surface of the body where edges of four sections meet.

9. The pet toy of claim 1 further including:
a sidewall having a substantially uniform thickness; and
a central opening formed through the exterior surface;
wherein each of the sections has a triangular shape.

10. The pet toy of claim 9, wherein:
the central opening extends through opposite sides of the body and a rope is routed through the central opening so that respective portions of the rope extend beyond the opposite sides of the body.

11. The pet toy of claim 1, wherein:
the pet toy is made of an elastomeric material including a rubber compound.

12. A pet toy comprising:
a body having an exterior surface;
a hollow core forming an interior of the body; and
a plurality of sections extending outward from the exterior surface and defined by grooves that bound each of the sections;
each of the grooves having a V-shape when viewed in cross-section; and wherein a depth of the grooves is between about 1/16th to 1/4th inch, a diameter of the pet toy is at least 2.5 inches, and a width of the grooves as measured near the exterior surface is between about 3/8 to 1/2 inch.

13. The pet toy of claim 12, wherein:
the depth of the grooves is between about 1/16th to 1/8th inch.

14. The pet toy of claim 12, wherein:
a diameter of the pet toy is between about 2.5 to 4.0 inches.

15. The pet toy of claim 12, wherein:
a weight of the pet toy is between about 8 to 11 ounces.

16. The pet toy of claim 12, wherein:
a diamond shaped-area is present at six locations on the exterior surface of the body where edges of four sections meet.

17. The pet toy of claim 12 further including:
a sidewall having a substantially uniform thickness; and
a central opening formed through the exterior surface;
wherein each of the sections has a triangular shape.

18. The pet toy of claim 17, wherein:
the central opening extends through opposite sides of the body and a rope is routed through the central opening so that respective portions of the rope extend beyond the opposite sides of the body.

19. The pet toy of claim 12, wherein:
the pet toy is made of an elastomeric material including a rubber compound that is resistant to puncturing by a bite of an animal.

20. A pet toy comprising:
a body having an exterior surface;
a hollow core forming an interior of the body; and
a plurality of sections extending outward from the exterior surface and defined by grooves that bound each of the sections;
each of the grooves having a V-shape when viewed in cross-section and an angle subtended by the V-shape is between about 30° to 60°; and
wherein a depth of the grooves is between about 1/16th to 1/4th inch, a diameter of the pet toy is at least 2.5 inches, a width of the grooves as measured near the exterior surface is between about 3/8 to 1/2 inch and the pet toy is made of an elastomeric material including a rubber compound that is resistant to puncturing by a bite of an animal.

* * * * *